United States Patent Office 3,147,284
Patented Sept. 1, 1964

3,147,284
ANTHRAQUINONE DYESTUFFS
Paul Rhyner, Basel, Switzerland, assignor to Ciba
Limited, Basel, Switzerland, a Swiss firm
No Drawing. Filed Feb. 7, 1962, Ser. No. 171,574
Claims priority, application, Switzerland,
Feb. 21, 1961, 2,043/61
6 Claims. (Cl. 260—347.7)

The present invention is based on the observation that valuable water-insoluble anthraquinone dyestuffs are obtained when a dyestuff of the formula

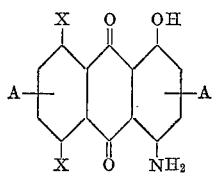

(1)

is treated with a halogenating agent. In the above formula one X represents a hydroxyl group and the other X represents an amino group, one A represents an alkyl group which, if desired, may be substituted by an aryl or heterocyclic radical, and the other A represents a hydrogen atom or an alkyl group which, if desired, may be substituted by an aryl or heterocyclic radical.

The starting materials preferably used are compounds of the general formula (2)

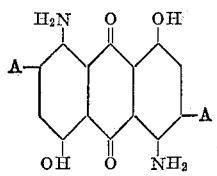

or (3)

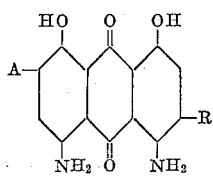

in which one A represents an alkyl radical which, if desired, may be substituted by an aryl or heterocyclic radical, and the other A represents a similar radical or a hydrogen atom.

As alkyl radicals there may be mentioned more especially lower alkyl radicals, e.g. containing at the most 6 carbon atoms, such as methyl, ethyl, propyl or butyl radicals, and as substituted alkyl radicals there may be mentioned benzyl or furfuryl radicals.

As examples of such starting materials there may be mentioned:

1:5-dihydroxy-4:8-diamino-3:7-dimethyl-anthraquinone,
1:5-dihydroxy-4:8-diamino-3-methyl-anthraquinone,
1:8-dihydroxy-4:5-diamino-3:6-dimethylanthraquinone,
1:8-dihydroxy-4:5-diamino-3-methylanthraquinone.

Such compounds can be obtained by the known method by reacting leuco-1:5-dihydroxy-4:8-diamino- or 1:8-dihydroxy-4:5-diaminoanthraquinone or the corresponding sulfonic acids with an aldehyde, for example formaldehyde, acetaldehyde, propionaldehyde, butyric aldehyde, benzaldehyde or crotonaldehyde, in the presence of hydrosulfite.

Mixtures of the dyes produced according to the process herein described can also be used in place of pure dyes, for example a mixture of dyes of the general Formulas 2 and 3 given above.

Chlorine and, especially bromine, are preferably used as the halogenating agents. Halogenation is advantageously carried out in a solvent, preferably sulfuric acid. The most suitable ratio is 5 parts of solvent to 1 part of compound to be halogenated. Halogenation should be carried out under conditions which allow approximately one halogen atom to be introduced into the hydroxy-amino-anthraquinone molecule. This is achieved, for example, by using roughly one mol of halogenating agent per one mol of hydroxyaminoanthraquinone. Halogenation is advantageously carried out at a slightly elevated temperature, for example between 20 and 100° C. If necessary, boric acid and catalysts generally used during halogenation, e..g. iodine, can be added to the reaction mixture. If A is an unsaturated alkyl radical, a halogen can attach itself to the olefinic double bond.

Working up may be carried out in the presence of sulfuric acid as solvent, the reaction mixture preferably being either added to water or poured on to ice, whereupon the product of halogenation is precipitated and can be filtered off.

The dyes obtained by the process herein described correspond to the formula

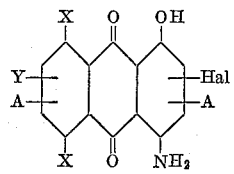

in which one X is a hydroxyl group and the other X is an amino group, in which A is an alkyl group which, if desired, can be substituted by an aryl or heterocyclic radical or halogen atom, and the other A represents a hydrogen atom or an alkyl group which, if desired, may be substituted by an aryl or heterocyclic radical or halogen atoms and in which Hal is a halogen atom and Y a hydrogen or halogen atom. They can be used as single dyes or in admixture with one another, the mixtures preferably having 0.5 to 1.5 halogen atoms per mol of dyestuff united to the nucleus.

When the dyes have been converted into a fine dispersion, they produce clear blue dyeings of good fastness to light and sublimation on hydrophobic fibers, especially fibers made of aromatic polyesters such, for example, as polyethylene terephthalates.

The following examples illustrate the invention and, except where otherwise stated, the parts and percentages are by weight and the temperatures given in degrees centigrade.

EXAMPLE 1

29.8 parts of 1:5-dihydroxy-4:8-diamino-3:7-dimethyl-anthraquinone are dissolved in 500 parts of sulfuric acid and
10 parts of boric acid, after which
16 parts of bromine are added whilst stirring.

The temperature of the mixture is then raised to 60° in the course of 2 hours and maintained at 60° for 4 hours whilst stirring. The cold reaction mixture is poured on to ice whereby the dye is precipitated. The dye is filtered by suction, washed until neutral and dried. The dye is obtained in a good yield and is a dark violet powder with a bromine content of about 17%. When dispersed in the usual manner and applied to polyester fibers it yields greenish blue dyeings of very good fastness to light.

EXAMPLE 2

28.4 parts of 1:5-dihydroxy-4:8-diamino-3-methyl-anthraquinone are dissolved in 300 parts of 85% sulfuric acid
12 parts of boric acid
0.3 part of iodine, after which
9 parts of bromine are added whilst stirring, and the mixture is heated to 60 to 80° over a period of 6 hours. The cold reaction mixture is poured on to ice whereby the dye is precipitated. The dye, which is filtered off with suction, washed neutral and dried, has the formula

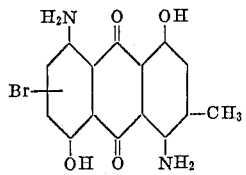

and is a dark violet powder containing about 12% bromine. When dispersed in the usual manner and applied to polyester fibers it yields greenish blue dyeings of very good fastness to light. If, instead of 28.4 parts of 1:5-dihydroxy-4:8-diamino-3-methyl-anthraquinone, 32.5 parts of 1:5-dihydroxy-4:8-diamino-3-butenyl-(2:3)-anthraquinone are used which, according to Marschalk, Bul. Soc. ch. de France 1936, (5) 3 1545, can be produced by reacting leuco-1:5-dihydroxy-4:8-diaminoanthraquinone with crotonaldehyde, a dye is obtained which contains approximately 20% bromine and which exhibits similar dyeing properties.

EXAMPLE 3

35.1 parts of 1:5-dihydroxy-4:8-diamino-3-furfuryl-anthraquinone are dissolved in 400 parts of 98% sulfuric acid,
12 parts of boric acid and
0.3 part of iodine, after which
12 parts of bromine are added whilst stirring, and heated to 70 to 80° over a period of 4–6 hours.
The cold reaction mixture is poured on to ice, whereby the dye is precipitated. The dye of the formula

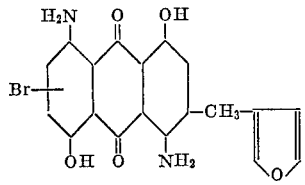

is isolated and dried. Its bromine content is about 14%. It dyes polyester fibers greenish blue shades of excellent fastness to light.

EXAMPLE 4

36 parts of 1:5-dihydroxy-4:8-diamino-3-benzyl-anthraquinone are dissolved in 500 parts of concentrated sulfuric acid
12 parts of boric acid
0.5 part of iodine, after which
12.5 parts of bromine are added, and the mixture is heated to 80° over a period of 7 hours. The cold reaction product is poured on to ice, filtered by suction, washed until neutral and then dried. The dark violet dye of the formula

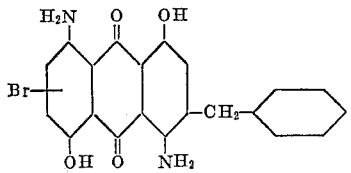

contains about 19% bromine and, from an aqueous dispersion, dyes polyester fibers strong blue shades of high fastness to light.

EXAMPLE 5

28.4 parts of 1:8-dihydroxy-4:5-diamino-3-methyl-anthraquinone are dissolved in 300 parts of $H_2SO_4$ conc.,
12 parts of boric acid,
0.3 part of iodine, after which
9 parts of bromine are added, and heated to 60 to 70° over a period of 6 hours. The cold reaction mixture is poured on to ice, the dye isolated by suction filtering, washed until neutral and then dried. The dye obtained of the formula

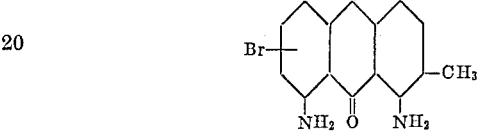

is a dark violet powder. Its bromine content is about 15%. It dyes polyester fibers an intense blue from an aqueous dispersion.

EXAMPLE 6

28.4 parts of 1:5-dihydroxy-4:8-diamino-3-methyl-anthraquinone are dissolved in 300 parts of 98% sulfuric acid with the addition of 0.2 part of iodine, and
12 parts boric acid, and chlorine introduced over a period of 2 to 3 hours at 50 to 60°. The cold reaction mixture is poured on to ice, the dye isolated by suction filtering, washed until neutral and then dried. The dye of the formula

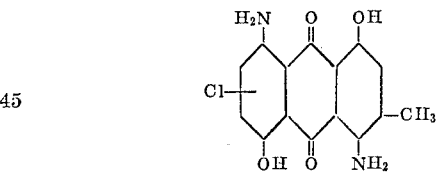

is obtained as a blue powder in good yield and dyes polyester fibers in fast-to-light blue shades from an aqueous dispersion. Chlorine content approximately 10%.

Dyeing Procedure 1 part of an aqueous paste of the dye obtained by the process of Example 1 is milled to a fine paste in a roller mill along with approximately 1 part of dried sulfite cellulose waste liquor, the paste having a dye content of approximately 10%.

100 parts of polyethylene terephthalate fiber material are washed for half an hour in a bath made up of 1 to 2 parts of the sodium salt of N-benzyl-µ-heptadecylbenzimidazole-disulfonic acid and 1 part of a concentrated aqueous solution of ammonia per 1000 parts of water. The material is then entered into a dyebath of 3000 parts of water in which 10 parts of the dyestuff paste prepared according to the preceding paragraph with the addition of 4 parts of the sodium salt of N-benzyl-µ-heptadecylbenzimidazole-disulfonic acid have been dispersed. The whole is heated to 120° in a pressure vessel and maintained at this temperature for approximately half an hour. Subsequently the material is well rinsed and, if necessary, washed for half an hour at 60 to 80° with a solution containing 1 part of the sodium salt of N-benzyl-µ-heptadecylbenzimidazole-disulfonic acid per 1000 parts water.

What is claimed is:
1. An anthraquinone dye of the formula

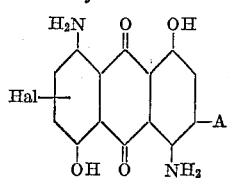

in which A represents a member selected from the group consisting of lower alkyl, benzyl, furfuryl and Hal represents halogen.

2. A dyestuff of the formula

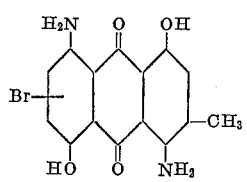

3. A dyestuff of the formula

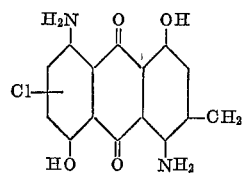

4. A dyestuff of the formula

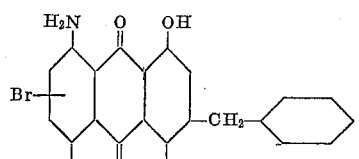

5. A dyestuff of the formula

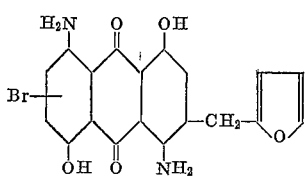

6. A dyestuff of the formula

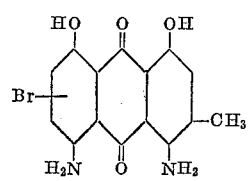

References Cited in the file of this patent
UNITED STATES PATENTS 2,321,767    Ogilvie _____ June 15, 1943
2,990,413    Gehrke _____ June 27, 1961

UNITED STATES PATENT OFFICE
CERTIFICATE OF CORRECTION

Patent No. 3,147,284

September 1, 1964

Paul Rhyner

It is hereby certified that error appears in the above numbered patent requiring correction and that the said Letters Patent should read as corrected below.

Column 5, lines 24 to 50, the formula should appear as shown below instead of as in the patent:

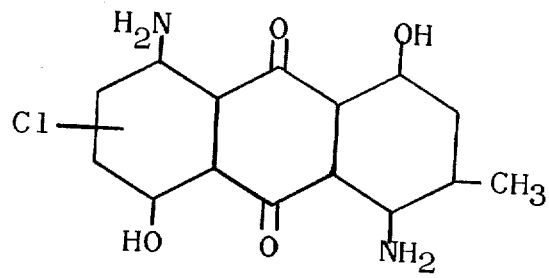

Signed and sealed this 29th day of December 1964.

(SEAL)
Attest:

ERNEST W. SWIDER
Attesting Officer

EDWARD J. BRENNER
Commissioner of Patents